Oct. 25, 1955  E. F. ANDREWS  2,721,676
DISPENSING CONTAINER COMPRISING A RIGID OUTER RECEPTACLE
AND A FLEXIBLE TWISTABLE INNER RECEPTACLE
Filed Oct. 22, 1951  3 Sheets-Sheet 1
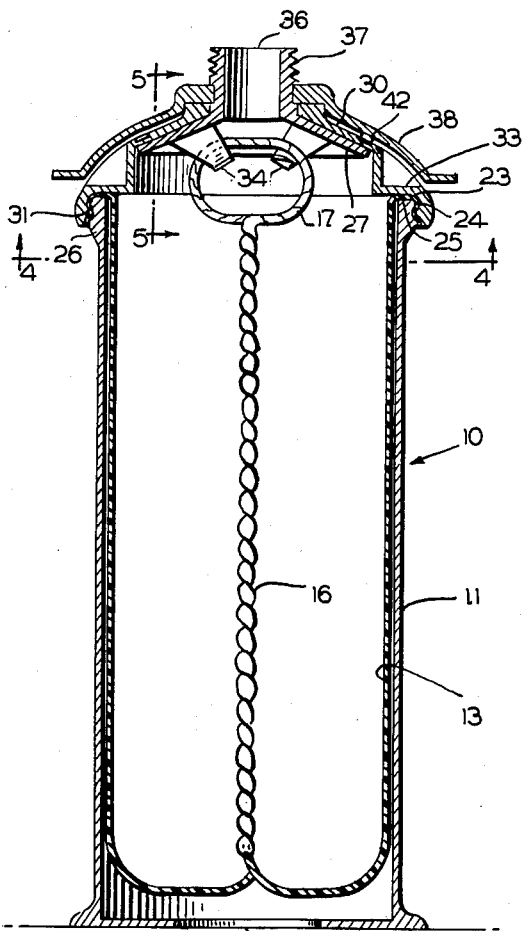
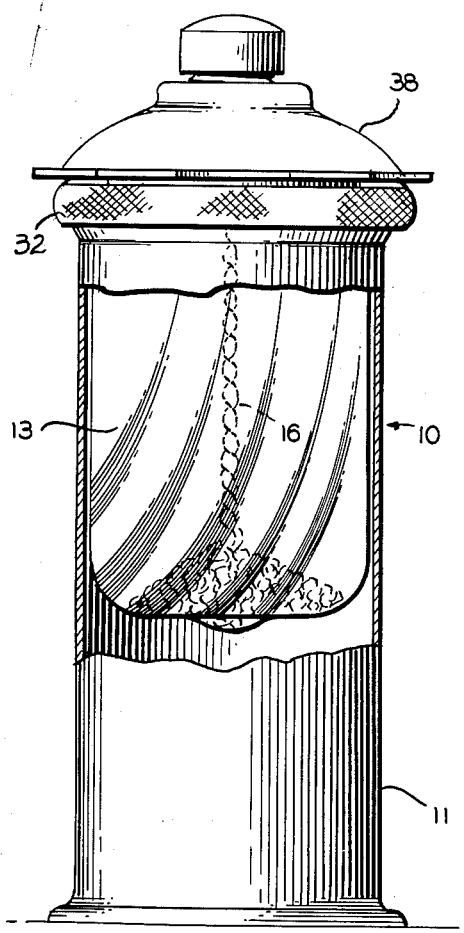
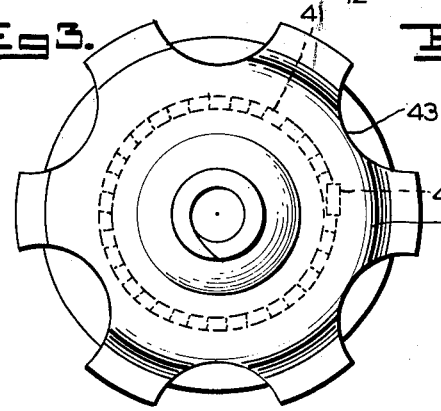
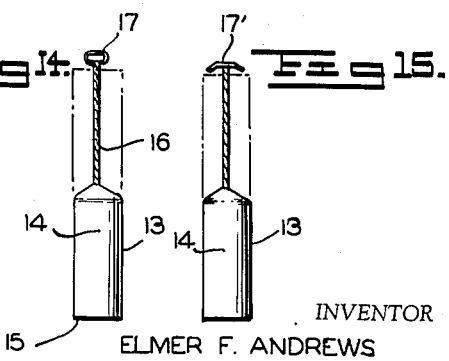
INVENTOR
ELMER F. ANDREWS
BY Cushman, Darby & Cushman
ATTORNEY Oct. 25, 1955   E. F. ANDREWS   2,721,676
DISPENSING CONTAINER COMPRISING A RIGID OUTER RECEPTACLE
AND A FLEXIBLE TWISTABLE INNER RECEPTACLE
Filed Oct. 22, 1951   3 Sheets-Sheet 2
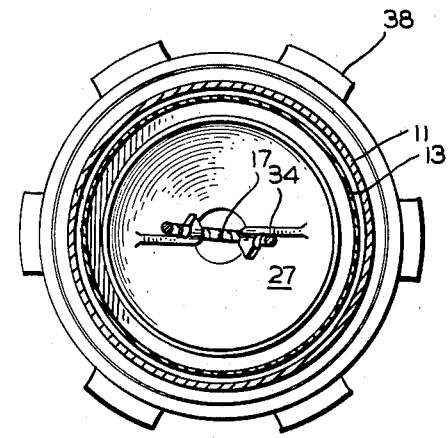
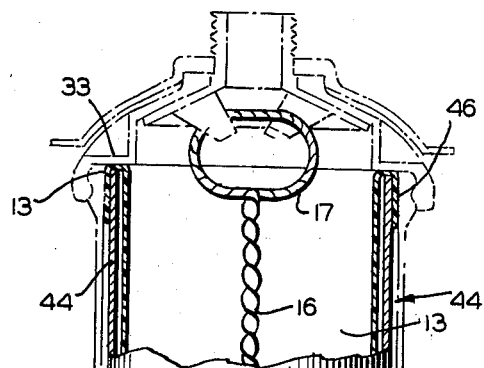
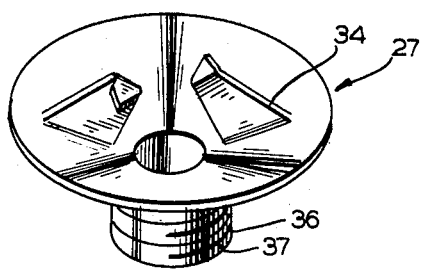
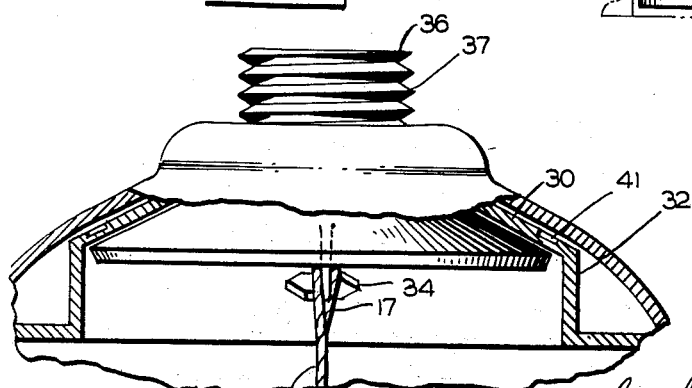
INVENTOR
ELMER F. ANDREWS
BY *Cushman, Darby & Cushman*
ATTORNEY Oct. 25, 1955 E. F. ANDREWS 2,721,676
DISPENSING CONTAINER COMPRISING A RIGID OUTER RECEPTACLE
AND A FLEXIBLE TWISTABLE INNER RECEPTACLE
Filed Oct. 22, 1951 3 Sheets-Sheet 3
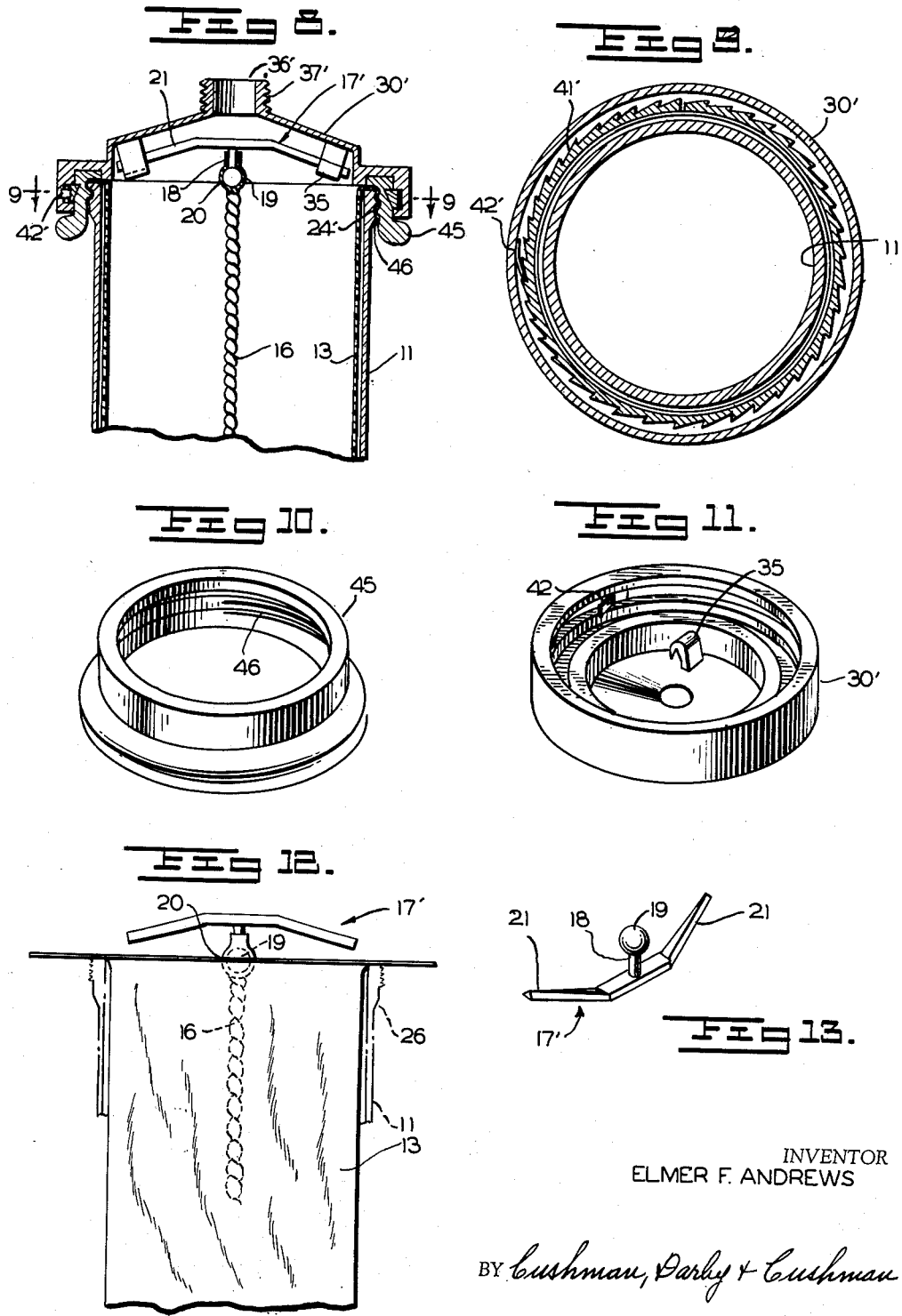
INVENTOR
ELMER F. ANDREWS
BY *Cushman, Darby & Cushman*
ATTORNEY

United States Patent Office 2,721,676
Patented Oct. 25, 1955

2,721,676

DISPENSING CONTAINER COMPRISING A RIGID OUTER RECEPTACLE AND A FLEXIBLE TWISTABLE INNER RECEPTACLE

Elmer F. Andrews, Washington, D. C.

Application October 22, 1951, Serial No. 252,553

9 Claims. (Cl. 222—104)

This invention relates to dispensing containers particularly useful for pastes and creams, such as toothpaste and shaving creams.

The primary object of the invention is to provide a dispensing container which will cleanly and without waste extrude a measured or required amount of paste or cream.

An equally important object of the invention is to provide a dispensing container which can be operated while held in one hand of the user.

Another object of the invention is to provide a dispensing container which includes a permanent, rigid receptacle and a replaceable unit holding the paste or cream and made of flexible material. That is, one purchases the container, usually with a unit in place, and thereafter will simply purchase units which may be readily positioned in the receptacle when the contents of a previous unit have been dispensed.

A further object of the invention is to provide a dispensing container which will assure economical use of the contents in that, as distinguished from conventional collapsible tube containers, all of the paste or cream in a unit can be dispensed and used.

These and other objects of the invention will appear more clearly from the accompanying drawings, in which:

Figure 1 is a sectional view of a preferred form of dispensing container in accordance with this invention.

Figure 2 is a side elevation of the container of Figure 1, partly broken away.

Figure 3 is a top plan view of Figure 1.

Figure 4 is a sectional view on the line 4—4 of Figure 1.

Figure 5 is an enlarged fragmental sectional view on the line 5—5 of Figure 1.

Figure 6 is a side elevation of the container, partly broken away and showing a replaceable unit inserted therein.

Figure 7 is an inverted perspective view of one of the operating members of Figure 1.

Figure 8 is a fragmental side elevation of a modified form of the dispensing container.

Figure 9 is a section on the line 9—9 of Figure 8.

Figure 10 is a perspective view of the adapter for the closure top shown in the modified form of Figure 8.

Figure 11 is an inverted perspective view of the closure of Figure 8.

Figure 12 is a sectional view of a modification of the dispensing container in which the flexible material of the replaceable unit is folded over and about the lip of the permanent receptacle, the folded-over material being held between cooperating threads of the closure and the thickened portion at the top of the receptacle.

Figure 13 is an inverted perspective view of the operating member which is employed with the modification of the invention shown in Figure 8.

Figure 14 is an elevation of the replaceable unit which will contain paste or cream and is removably positioned in the receptacle as shown in Figures 1 and 6, and Figure 15 is an elevation of the replaceable unit which will contain paste or cream and is removably positioned in the receptacle shown in Figure 8.

Referring specifically to the drawings, wherein like characters or numerals represent like or similar parts, the invention consists of a new and useful type of toothpaste or shaving cream dispenser. As best shown in Figure 1, the preferred embodiment of the invention is comprised of the container indicated as a whole at 10, and including an outer receptacle 11 having a base 12. This outer receptacle 11 is relatively rigid and is preferably made of a plastic material. The receptacle 11 is provided with a circular cutout 9 in the base 12, the purpose of which will be evident later in the specification.

Referring to Figures 1 through 7, inclusive, and Figure 14, there is positioned in the receptacle 11 a unit 13 containing paste or cream, which is made of a relatively thin, flexible, moisture and grease impervious material, of which there are many varieties available commercially. This unit is shown in Figure 14 in its extended position prior to filling, and comprises a cylindrical body 14 having an open end 15 which may be beaded. At its opposite end, the body 14 is twisted to provide a flexible centrally-disposed extension 16.

The free end of the extension 16 has a loop 17 formed therein. The loop 17 may be made from the twisted extension 16 or it may be a separate piece of string or cord integrally attached in any convenient manner to the extension 16. In either case, the loop 17 must be treated so that it is relatively stiff, but somewhat elastic, as will be explained in more detail later in the specification.

Referring to Figures 1 and 14, the body portion 14 of the flexible unit is pulled over the twisted extension 16, as shown in the dotted line, to form a container unit indicated at 13 in Figures 1, 2, 6, 8, and 12. This container unit 13 is now filled with cream or paste and sold as a replaceable element of the dispensing container, or sold with the dispensing container. If it is sold as a replaceable unit, any suitable top or closure may be employed so long as the same is readily removable when it is desired to insert the container unit 13 in the rigid dispensing container 11. The loop 17, as previously stated, must be relatively stiff, but still elastic, as it will have to be folded down when a top or closure is employed. On removal of the top or closure, the loop 17 must retain a vertical position so that it may engage an operating member of the dispensing container.

As shown in Figure 1, the free edge of the container unit 13 is turned outwardly, as shown at 23, so as to be received around the threads 24 and upon the flat upper surface 25 of the outwardly thickened threaded portion 26 of the receptacle 11. A closure member 30 having the threaded skirt 31 is then threaded upon the threaded outwardly thickened portion 26 at the top of the receptacle 11. The closure 30 is generally dome-shaped and is provided with a knurled edge or the like 32 for gripping it when securing it to the receptacle 11. The bottom flange 33 of the closure member 30 is flat, and engages the overlapped portion 23 of the flexible unit 22 to lock the same firmly in position upon the upper edge 25 of the receptacle 11.

Carried by the closure member 30 interiorly thereof, is the operating member 27 having a pair of hooks 34 depending downwardly therefrom. The hooks 34 are adapted to engage the loop member 17 when the replaceable unit 13 is inserted into the dispensing container 11. The operating member 27 has a tubular extension 36 through which the paste or cream may be extruded. The tubular extension 36 is provided with threads 37, so that a cap, not shown, may be threaded onto the dispensing container when said container is not in use.

It will be noted that the dome-shaped closure member 30 will be fixed with respect to the container 11, while the operating member 27 may be rotated within the closure member 30. Attached integrally to the operating member 27 is a dome-shaped cover or element 38 having finger recesses 43 therein. Since the cover or element 38 is integral with the operating member 27, it is evident that it may be used to rotate the operating element. The element 38 is provided with a spring detent 42 that is adapted to cooperate with a circular series of small recesses 41 located in the top of the closure member 30. The detent 42 and the recesses 41 allow the member 38 to be turned in only one direction when dispensing paste or cream. This ratchet effect is necessary, because the loop 17 would become loose from the hooks 34 of the operating member 27 if the element or member 38 was turned in the opposite or a counterclockwise direction. The recesses 41 in the closure member 30 are so spaced as to provide an effective means for measuring the amount of cream or paste which will be dispensed.

Figure 1 shows a dispensing container as it will be sold as a unit, in that the flexible unit 13 will come installed in the container. The means of attaching the flexible unit 13 in the container in this particular instance is by having the free ends of the unit 13 lapped over and secured in place between the flange 33 of the closure member 30 and the upper edge 25 of the receptacle 11, as previously explained. Figure 6, on the other hand, discloses the container 11 with a replaceable unit 13 inserted therein. It will be noted in this embodiment of the invention that the flexible unit 13 will come inserted in a light cylindrical cardboard container 44 or the like, having its ends 46 turned over said container. The container 44 provides an easy method of shipping and supplying the units 13. In this embodiment, the seal between the flexible unit 13 and the container is provided for by means of a flange 33 of the closure 30 pressing on the flexible unit 13 and the cylindrical container 44.

Figure 8 discloses a modified form of dispensing container, wherein the unit 13 has an extension 16 disposed centrally thereof and to the free end of the extension 16 is connected a T-shaped element 17'. As best shown in detail in Figure 13, the T-shaped element 17' preferably includes a base having an upstanding pin 18 provided with a ball head 19 which is permanently secured in any suitable manner to the outermost twist of the extension 16, as shown at 20. Any desired means of securing the T-shaped element 17' to the twisted extension 16 may be employed, and any suitable operating member may be used, providing the same is formed to engage the wings 21 of the element 17'. In this modification of the invention, the closure member 30' also serves as the operating member for dispensing the cream or paste from the unit 13. A pair of downwardly extending lugs 35 integral with the closure or operating member 30' will engage the wings 21 of the T-shaped element 17'. The closure member 30' has a tube extension 36' through which toothpaste or shaving cream may be extruded. The tubular extension 36' is provided with threads 37' which may be utilized in securing a cap to the device.

The closure or operating member 30' is adapted to rotate relative to the container or rigid receptacle 11 so that the lugs 35 will engage and rotate the element 17 and dispense the cream or paste from the unit 13. The means of accomplishing this result is the provision of an adapter ring 45 having internal threads 46 which cooperate with the threads 24' in the top of the container 11. The closure or operating member 30' has an internally projecting spring finger or detent 42', which will engage the circumferential teeth 41' mounted on the adapter 45. The teeth 41 may be integral with the adapter 45 or they may be on a lock ring mounted in a groove provided in the adapter. However, in either case the teeth must have no relative movement with respect to the receptacle 11. As previously explained in the preferred embodiment of the invention, the rotating closure member must rotate in only one direction. Consequently, the ratchet teeth 41' and the spring detent 42' will allow the closure or operating member 30' to be rotated in only a clockwise direction and for each unit of rotation of the member 30' a measured quantity of paste or cream will be dispensed.

Figure 12 discloses another modification of the replaceable unit, in that it shows how the flexible material of the replaceable unit 13 may be folded over the lip portion 26 of the receptacle 11. The flexible material will then be locked in position between the threads of the lip portion 26 and the threads of the adapter 45.

In operation, the replaceable unit 13 may be inserted in the container or receptacle 11, and the loop member 17 may be hooked to the operating member 27. As the operating member 27 is rotated in a clockwise direction, it will in turn twist the extension 16, drawing the unit 13 upwardly, that is shortening the same, as will be apparent from reference to Figure 2. The circular cutout 9 is provided in base member 12 so that air may displace the space of the drawn-up unit 13. By making the cutout 9 of sufficient size, as shown in Figure 1, the user may also observe the flexible bag or unit 13 and determine when it is necessary to replace the bag. Holding the container in one hand, the user can turn the member or element 38 through any distance desired and dispense a precise amount of paste or cream. Thereafter, the other hand may be used to remove the same and to apply the closure cap to the threaded portion 37 of the closure member 30. It will be noted by reason of the construction just described, that twisting of the flexible unit 13 can be accomplished until the same has been so drawn upwardly that all contents of the unit 13 will be dispensed or extruded through the outlet 36. Furthermore, it will be noted that the unit 13 is suspended in a rigid receptacle 11 and conforms to the general interior contour thereof.

The modified form of the device shown in Figures 8 through 15 will operate in approximately the same manner as the preferred embodiment. Rotation of the closure or operating member 30' will rotate the depending lugs 35 which in turn will engage the wings 21 of the T-shaped element 17' and twist the flexible unit 13, thereby drawing upwardly the same and dispensing the cream or paste therein.

The terminology used in this specification is for the purpose of description, and not for limitation, as the scope of the invention is defined in the claims.

I claim:

1. In a dispensing device for dispensing plastic materials comprising in combination a rigid outer receptacle, a flexible inner receptacle for receiving said plastic material, a removable closure member mounted on said rigid outer receptacle and retaining said flexible inner receptacle in position, means carried by said closure member for twisting said flexible inner receptacle within said rigid outer receptacle to extrude said plastic materials therefrom, said means including an operating member carried for rotation by said closure member and having a tubular extension through which said plastic material is extruded, a pair of downwardly extending hooks mounted on said operating member, and a centrally upwardly and interiorly disposed extension of said flexible inner receptacle having means at its free end for engaging said hooks, said extension being substantially as long as said flexible inner receptacle so that the means at its free end for engaging said hooks will be above the surface of plastic material in said flexible receptacle.

2. The dispenser of claim 1 wherein the means for engaging said hooks include a loop shaped member integral with said extension.

3. In a dispensing device for dispensing plastic materials comprising in combination a rigid outer receptacle, a flexible inner receptacle for receiving said plastic materials, an adapter member carried by said rigid outer receptacle and retaining said flexible inner receptacle in position, a closure member mounted for rotation on said adapter member and having a tubular extension through which said plastic material is extruded, means carried by said closure member for twisting said flexible inner receptacle within said outer receptacle to extrude said plastic materials therefrom, said means including a pair of downwardly extending lugs mounted on said closure member and a centrally upwardly and interiorly disposed extension of said flexible inner receptacle having means attached to its free end for engaging said lugs, said extension being substantially as long as said flexible inner receptacle so that the means at its free end for engaging said hooks will be above the surface of plastic material in said flexible inner receptacle.

4. The dispenser of claim 3 wherein the means carried by said centrally disposed extension of said flexible inner receptacle for engaging said downwardly depending lugs includes a T-shaped member rigidly connected thereto.

5. In a dispensing device for dispensing plastic materials comprising in combination a rigid outer receptacle, a flexible inner receptacle for receiving said plastic material, a removable closure member mounted on said rigid outer receptacle and retaining said flexible inner receptacle in position, means carried by said closure member for twisting said flexible inner receptacle within said rigid outer receptacle to extrude said plastic materials therefrom, said means including an operating member carried for rotation by said closure member and having a tubular extension through which said plastic material is extruded, a pair of downwardly extending hooks mounted on said operating member, a centrally upwardly and interiorly disposed extension of said flexible inner receptacle having means at its free end for engaging said hooks, and means for dispensing a measured quantity of said plastic material.

6. The dispenser of claim 5 wherein said means for dispensing a measured quantity of said plastic material includes a dome-shaped cover element rigidly secured to said rotatable operating member, a spring detent mounted on said dome-shaped cover element, a circular series of recesses in said closure member which cooperate with said spring detent.

7. In a dispensing device for dispensing plastic materials comprising in combination a rigid outer receptacle, a flexible inner receptacle for receiving said plastic materials, an adapter member carried by said rigid outer receptacle and retaining said flexible inner receptacle in position, a closure member mounted for rotation on said adapter member and having a tubular extension through which said plastic material is extruded, means carried by said closure member for twisting said flexible inner receptacle within said outer receptacle to extrude said plastic materials therefrom, said means including a pair of downwardly extending lugs mounted on said closure member and a centrally upwardly and interiorly disposed extension of said flexible inner receptacle having means attached to its free end for engaging said lugs, and means for dispensing a measured quantity of said plastic material.

8. The dispenser of claim 7 wherein the means for dispensing a measured quantity of plastic material includes a spring detent mounted on said closure member and a circular series of teeth mounted on said adapter for cooperating with said spring detent.

9. In a dispensing device for dispensing plastic materials comprising in combination a rigid outer receptacle having a base member, a flexible inner receptacle for receiving the plastic materials, a removable closure member mounted on said rigid outer receptacle and retaining said flexible inner receptacle in position, a centrally upwardly and interiorly disposed extension of said flexible inner receptacle, said extension being substantially as long as said flexible inner receptacle and having its free end extending above the surface of the plastic materials in said flexible inner receptacle, and means supported by said closure member engaging said extension of said flexible inner receptacle at its free end and for twisting said extension to extrude said plastic materials from said inner receptacle.

References Cited in the file of this patent

UNITED STATES PATENTS

| | | |
|---|---|---|
| 2,080,135 | Jezler | May 11, 1937 |
| 2,203,313 | Thorn | June 4, 1940 |

FOREIGN PATENTS

| | | |
|---|---|---|
| 495,856 | Great Britain | Feb. 15, 1937 |